United States Patent
Zhang et al.

(10) Patent No.: US 8,533,016 B1
(45) Date of Patent: Sep. 10, 2013

(54) SYSTEM AND METHOD FOR SELECTING A PORTFOLIO

(75) Inventors: Bin Zhang, Palo Alto, CA (US); Julie Ward Drew, Redwood City, CA (US); Qi Feng, Richardson, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2241 days.

(21) Appl. No.: 11/048,301

(22) Filed: Jan. 30, 2005

(51) Int. Cl.
*G06Q 10/00* (2012.01)

(52) U.S. Cl.
USPC ...................................... 705/7.11; 705/7.12

(58) Field of Classification Search
USPC ............................................ 705/7.11, 7.12
See application file for complete search history.

(56) References Cited

U.S. PATENT DOCUMENTS

| | | | |
|---|---|---|---|
| 6,584,433 B1 | 6/2003 | Zhang et al. | |
| 2002/0083159 A1 | 6/2002 | Ward et al. | |
| 2002/0091804 A1 | 7/2002 | Ward et al. | |
| 2002/0091845 A1 | 7/2002 | Ward et al. | |
| 2002/0161622 A1 | 10/2002 | Zhang et al. | |
| 2003/0018637 A1 | 1/2003 | Zhang et al. | |
| 2003/0033264 A1 | 2/2003 | Kirshenbaum et al. | |
| 2003/0065758 A1 | 4/2003 | O'Sullivan et al. | |
| 2003/0105868 A1 * | 6/2003 | Kimbrel et al. | 709/226 |
| 2003/0126097 A1 | 7/2003 | Zhang et al. | |
| 2003/0144859 A1 | 7/2003 | Hsu et al. | |
| 2003/0145294 A1 | 7/2003 | Ward et al. | |
| 2004/0083154 A1 | 4/2004 | Guler et al. | |
| 2004/0083155 A1 | 4/2004 | Zhang et al. | |
| 2004/0088145 A1 | 5/2004 | Rosenthal et al. | |
| 2004/0181479 A1 * | 9/2004 | Zosin et al. | 705/36 |
| 2004/0186814 A1 * | 9/2004 | Chalermkraivuth et al. | 706/16 |

OTHER PUBLICATIONS

Dorit S. Hochbaum, Selection, Provisioning, Shared Fixed Costs, Maximum Closure and Implications on Algorithmic Methods Today, INFORMS, Management Science, vol. 50, No. 6 (Jun. 2004), p. 709-723.*

Nagurney, Anna;Dong, June, "Financial Networks and Optimally-Sized Portfolios", Computational Economics; Feb. 2001; 17, 1.*

* cited by examiner

*Primary Examiner* — Mark A Fleischer

(57) ABSTRACT

Embodiments of the present invention are directed to selecting a portfolio. One embodiment of the present invention includes identifying a network comprising a source node, a target node, a first set of intermediate nodes that correspond to a set of objects from which a portfolio is selected, a second set of intermediate nodes, and a plurality of directed links. Also, the embodiment comprises initializing a network flow through the directed links and redistributing the flow through a subset of the plurality of directed links including directed links extending between the source node and the first set of intermediate nodes, between the first set of intermediate nodes and the second set of intermediate nodes. Further, the embodiment includes identifying members of the portfolio by determining which nodes of the first set of intermediate nodes have a network flow from the source node equal to or greater than a threshold value.

26 Claims, 4 Drawing Sheets

SYSTEM AND METHOD FOR SELECTING A PORTFOLIO

BACKGROUND

This section is intended to introduce the reader to various aspects of art, which may be related to various aspects of the present invention that are described or claimed below. This discussion is believed to be helpful in providing the reader with background information to facilitate a better understanding of the various aspects of the present invention. Accordingly, it should be understood that these statements are to be read in this light, and not as admissions of prior art.

In the business world, many companies offer products or services to consumers in order to produce revenue. However, these companies must often compete against each other for a finite number of customers. In order to gain a competitive advantage, some companies offer a broad variety of products (or services) in an attempt to increase their market share. While such variety has the potential to attract more customers, this proliferation of products can also be problematic.

For instance, as a company offers an increasing number of products, customers can become increasingly overwhelmed and frustrated by the difficulty of choosing from a large selection. Similarly, salespeople can find it difficult to make recommendations to customers from among the large array of choices. Further, in addition to the loss of market share, product proliferation generally contributes to increased actual expenses for a corporation. Such expenses include the costs associated with additional time and labor, shipping costs, and the cost of the inventory itself, both in terms of capital costs and the risk of obsolescence.

Frequently, customer orders actually consist of multiple products. In these cases, product proliferation can also complicate fulfillment of these orders. If one product in an order is unavailable, the delivery of the order could be delayed until that product is replenished. When a company offers a large number of products, it is typically difficult and costly to maintain high availability for all products in its offering. As a result, poor availability of even one product can cause delays in delivery of numerous orders, which, in turn, could adversely affect market share.

The range of products offered by a company is referred to as a product portfolio. Many companies select such a product portfolio by simply choosing the products that generate the most revenue. More specifically, a company might rank products according to how much revenue the products generated in recent historical orders, and choose a desired number of top ranked products. While this approach sounds obvious and is easy to implement, it can lead to poor product selection because it ignores the relationship between products and orders. For example, there could be a low revenue product that is an element of many customer orders. While the revenue generation attributable to that individual product or part might be slight in comparison to other products, it could be a necessary component of various orders containing other products that generate much larger revenues. Thus, excluding such a product might lead to loss of future order revenue.

DETAILED DESCRIPTION OF SPECIFIC EMBODIMENTS

One or more exemplary embodiments of the present invention will be described below. As used herein, a "portfolio" refers to a group of objects or ideas that is a subset of a larger group. While one embodiment of the present invention concerns a product portfolio, the present techniques are applicable to other portfolios as well. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
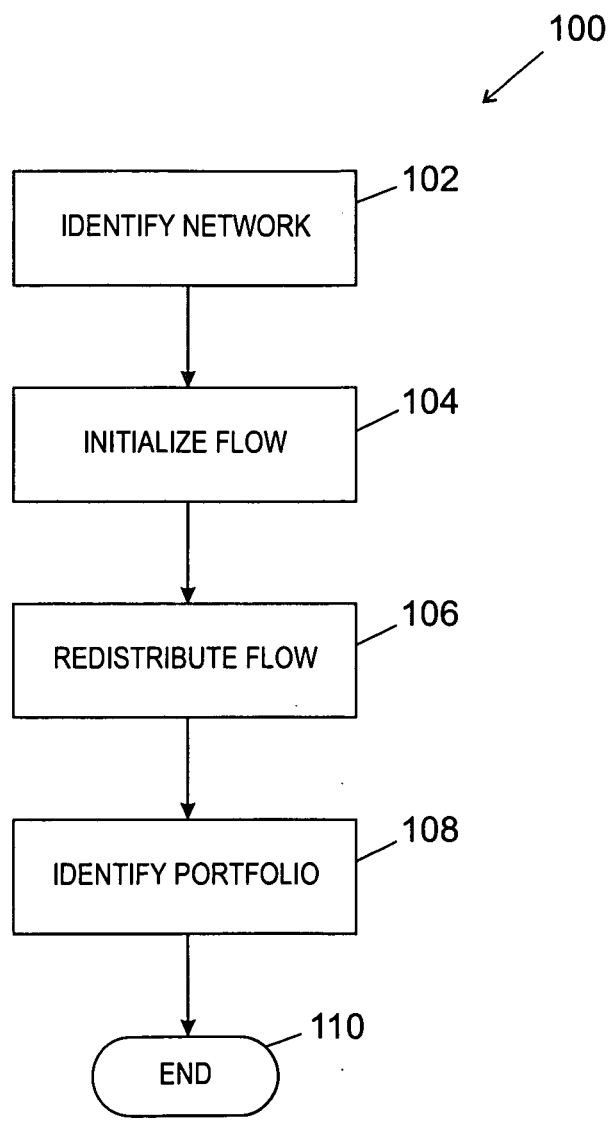
FIG. 1 is a flowchart illustrating one embodiment of steps for selecting a portfolio.

Turning now to the drawings, FIG. 1 is a flowchart 100 illustrating exemplary steps for selecting a portfolio in accordance with an embodiment of the present invention. The exemplary process begins with the identify network block 102. The identified network could be related to the exemplary network illustrated in FIG. 3, or could be some other network. Further, the network identified at this step can either be a preexisting network or created at this step for use with the present techniques. The identified network generally includes a source node, a target node, and two sets of intermediate nodes located between the source and target nodes. More particularly, in at least one embodiment, the first set of intermediate nodes is located between a source node and the second set of intermediate nodes, while the second set of intermediate nodes is positioned between the first set of intermediate nodes and a target node. Further, in one embodiment of the present invention, the first set of intermediate nodes represents products and the second set of intermediate nodes represents orders.

Additionally, in a preferred embodiment, the identified network has a plurality of directed links between the nodes. More particularly, there is a directed link from a source node to each node of the first set of intermediate nodes, and a directed link from each node of the second set of intermediate nodes to a target node. Also, a directed link extends from a node of the first set of intermediate nodes to a node of the second set of intermediate nodes if it is desirable to associate the two nodes. Such association is desirable, for instance, if the first and second sets of intermediate nodes represent products and orders, respectively. In such a case, if a product is part of an order, there is a directed link from an element of the first set of intermediate nodes to an element of the second set of intermediate nodes, wherein the elements correspond to the product and order, respectively. Further, the network could also comprise links with directions opposite those described above.

Figure 3:
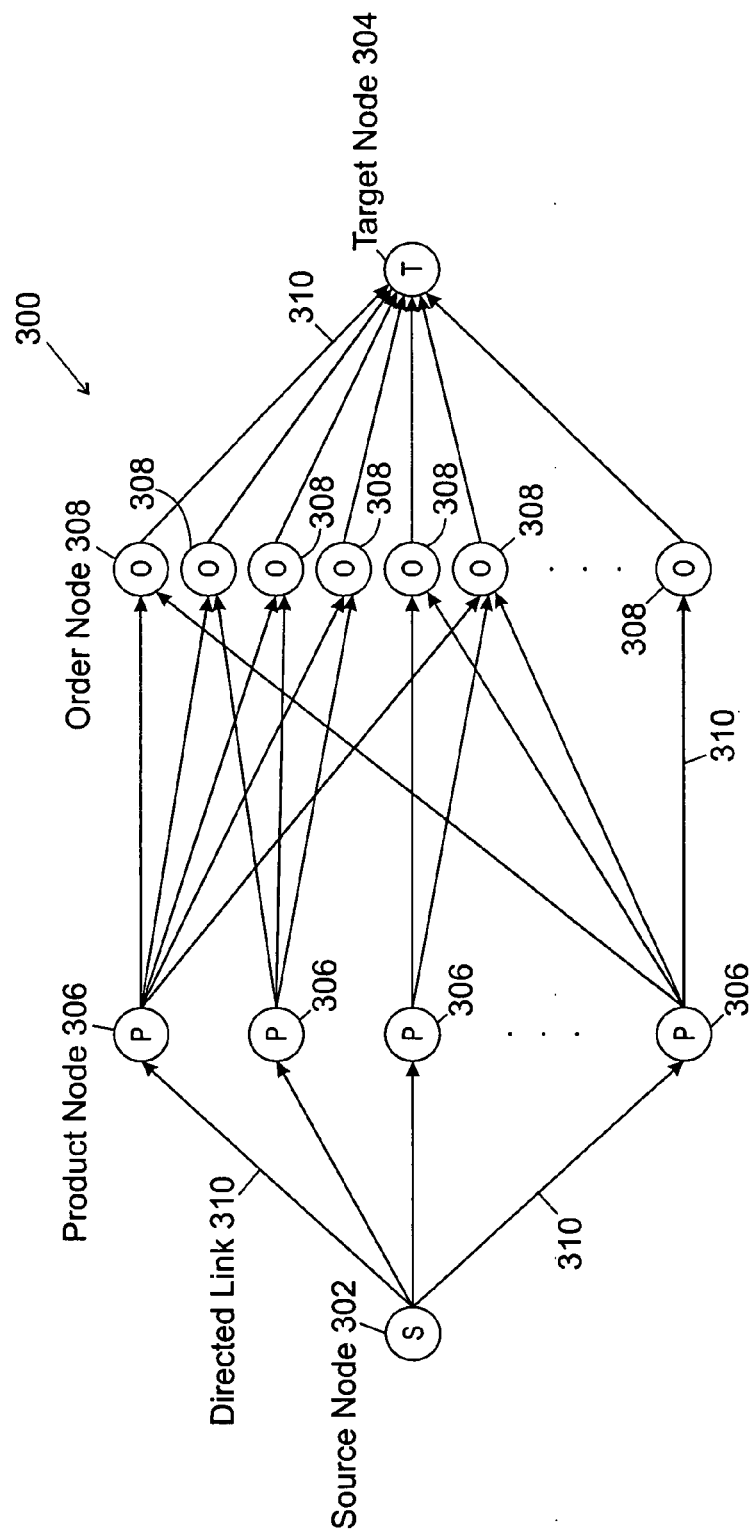
FIG. 3 is a block diagram illustrating one embodiment of a network.

The flow capacities of directed links originating from a source node or the first set of intermediate nodes are assumed to be infinite, whereas the flow capacities of the directed links extending from each node of the second set of intermediate nodes are limited to some amount associated with the individual node. For instance, in the exemplary network of FIG. 3 discussed more fully below, the second set of intermediate nodes represents orders, in which each order can be associated with the amount of revenue attributable to that order. In such a case, the flow capacity of the directed links from the order nodes of FIG. 3 is equivalent to the revenue generated by each respective order.

Next, a flow is initialized through the directed links of the identified network, represented as block 104 of the flowchart. Specifically, the flow is pushed from a source node to a target node through every direct path in such a way that all the directed links from the second set of intermediate nodes to a target node are full. Then, as shown at block 106, the flow is redistributed among the links extending between the source node and the first set of intermediate nodes, and between the first set of intermediate nodes and the second set of intermediate nodes. More particularly, in one embodiment, the flow is redistributed by first identifying two links from a source node that have unequal flow and then pushing flows to make their flow values as close as possible without causing any arcs having negative flows. This redistribution continues until no such pairs remain. Further, one or more members of the portfolio are identified based on the redistribution, as indicated at block 108, before the process ends at block 110. Additionally, such identification could also include generating a report identifying the one or more members.

Though embodiments of the present invention are capable of being applied in any number of optimization problems, they are particularly helpful in addressing the problems associated with product proliferation. For example, embodiments of the present invention can be employed to reduce a product portfolio to a subset of products expected to cover most demand. This generally helps reduce the costs of managing a product offering, while maintaining both the variety of products desired by customers as well as the revenue attributable to such customer demand.

More specifically, embodiments of the present invention assist in selecting a product set or portfolio that covers most historical orders. As discussed above, an order often comprises a set of products. In the PC business, for example, an order can consist of a chassis, a processor, a motherboard, a memory module, a graphics card, a monitor, a keyboard, a mouse, and a power cable. An order is "covered" by a product set if every product in the order is included in the set. Embodiments of the present invention provide for selecting a set consisting of no greater than n products to maximize the revenue of orders covered, for a range of values of n. Further, the method generates a collection of product portfolios along the efficient frontier of revenue coverage and set size. As would be appreciated by one skilled in the art, the term "efficient frontier" refers to an aggregate curve representing the optimal value of one or more functions over the domain of the one or more functions. Thus, in the embodiment described above comparing revenue and set size, the term "efficient frontier" corresponds to a curve defined by the maximum revenue over the domain of the set.

In one embodiment, optimization of revenue coverage involves finding a set of products of a size less than or equal to n that maximizes the revenue of orders covered. This problem can be formulated as an integer program (denoted by IP(n)) by defining decision variables, constraints (which can be physical or logical), and an objective function. In one embodiment, the integer problem is formulated as follows.

Decision Variables
The decision variables of IP(n) includes the variables $X_p$ and $Y_o$.

First, $X_p$ is defined such that:

$$X_p = \begin{cases} 1 & \text{if product } p \text{ is included in the product porfolio;} \\ 0 & \text{otherwise.} \end{cases}$$

Similarly, $Y_o$ is defined such that:

$$Y_o \begin{cases} 1 & \text{if order } o \text{ is covered by the product portfolio;} \\ 0 & \text{otherwise.} \end{cases}$$

Constraints
For IP(n), the constraints on the decision variables are as follows:
Order o is covered if each product p in the order is included:

$$Y_o \leq X_p \text{ for each product-order combination } (o,p)$$

At most n products are included:

$$E_p X_p \leq n$$

The decision variables X and Y are binary:

$$X_p \in \{0,1\}, Y_o \in \{0,1\}$$

Objective Function
Finally, the objective function of IP(n) is to maximize the total revenue of orders covered:

$$E_o R_o Y_o$$

Solving this integer program can be very difficult in practice. Typical data sets involve a vast number of product-order combinations, which could be on the order of hundreds of thousands or millions. For data sets involving hundreds of thousands of product-order combinations, the integer program could have hundreds of thousands of constraints, and can take days to solve. Moreover, in some very large cases this integer problem is unsolvable.

However, one approach to solving this problem is to create a related linear programming problem. For the problem IP(n), such a related linear programming problem is created by relaxing the integrality constraints of the $X_p$ and $Y_o$ decision variables and eliminating the constraint $\Sigma_p X_p \leq n$ and, instead, replacing it with a penalty term in the objective function. Such a penalty term is used to penalize the number of products used in the solution by some nonnegative number λ. This linear programming problem, which depends on the penalty X, can be called the Langrangian Relaxation LR(λ), which is formulated in one embodiment by defining decision variables, constraints, and an objective function, in the following manner.

Decision Variables
The decision variables of LR(λ) include the variables $X_p$ and $Y_o$.

Constraints
For IP(n), the constraints on the decision variables are as follows:
Order o is covered if each product p in the order is included:

$$Y_o \leq X_p \text{ for each product-order combination } (o,p)$$

The decision variables X and Y have values in the continuous interval [0,1]:

$$X_p \in [0,1], Y_o \in [0,1]$$

Objective Function
Maximize the total revenue of orders covered:

$$\Sigma_o R_o Y_o - \lambda(\Sigma_p X_p - n)$$

Of course, due to the distributive property, this objective function could also be written as:

$$\Sigma_o R_o Y_o - \lambda \Sigma_p X_p + \lambda n$$

However, $\lambda$ and n can be defined by the operator. As would be appreciated by one skilled in the art, the term $\lambda n$ will have the same affect on the maximization of the objective function regardless of the values of the other terms. Thus, the final term above can be omitted and the objective function can be represented as:

$$\Sigma_o R_o Y_o - \lambda \Sigma_p X_p$$

By solving LR($\lambda$) for a properly chosen series of values of $\lambda$, a series of solutions to IP(n) can be obtained for several values of n. In general, solving LR($\lambda$) will not yield solutions to IP(n) for all values of n, but it is often desirable to obtain solutions to IP(n) for as many values of n as possible. In doing so, a series of solutions can be generated along the efficient frontier of revenue coverage vs. portfolio size. Though this series of solutions may not provide an integer solution for every possible value of n, a dense curve of solutions can nonetheless be produced.

The problem LR($\lambda$) can be solved in a number of ways, including via a linear programming solver, or by a max-flow algorithm. However, for very large problems, each such problem can take several minutes to solve. Furthermore, solving the problem LR($\lambda$) for many values of $\lambda$ to create a dense efficient frontier could take many hours. Therefore, it is desirable to find a minimal set of values of $\lambda$ that yields the maximal density of the efficient frontier curve. Embodiments of the present invention permit selection of a minimal set of values $\lambda$ in order to generate a maximally-dense efficient frontier.

Figure 2:
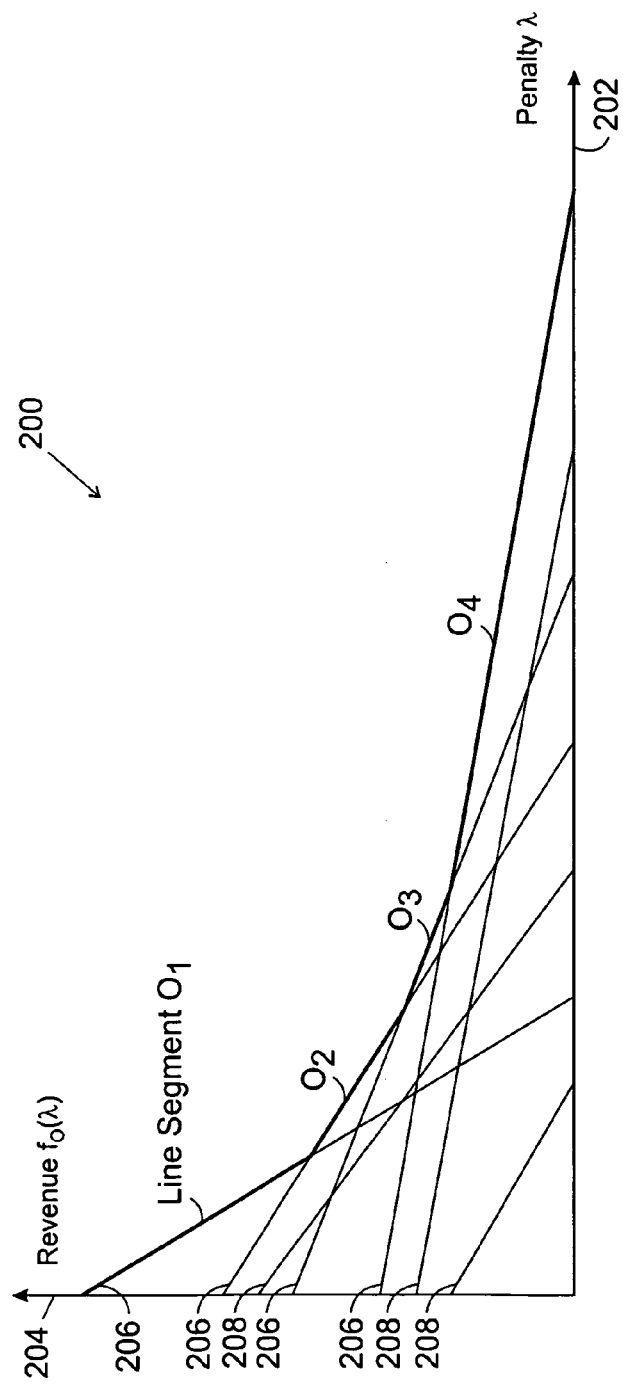
FIG. 2 is a graphical diagram illustrating one embodiment of the optimization of a function in accordance with the present techniques.

As would be appreciated by one skilled in the art, solving the problem LR($\lambda$) has a graphical interpretation. FIG. 2 is a graphical diagram 200 illustrating the optimization of a function, such as LR($\lambda$), in accordance with the present techniques. Solving the problem LR($\lambda$) is equivalent to finding the upper envelope of a set of linear functions of X. More specifically, for each subset O of orders, there is a linear function $f_O(\lambda) = R_o - \lambda |P_o|$, where $P_o$ represents the set of products in all orders in subset O. While $f_O(\lambda)$ corresponds to revenue in the present embodiment, one skilled in the art will understand that the function can be adjusted to correspond to other desired outputs, such as profit, order coverage, or the like. For instance, in another embodiment, setting $R_o = 1$ for all orders facilitates optimization of order coverage for a product set of a given size. Further, as would be appreciated by one skilled in the art, optimization of revenue, profit, order coverage, or the like, can also be determined for a set of objects of a given cost, or some other parameter, in accordance with the present techniques.

In graph 200, the value of the function $f_O(\lambda)$ corresponds to the vertical axis 204, which depends upon the value of the independent variable $\lambda$, represented on the horizontal axis 202. Solving LR($\lambda$) is equivalent to finding which order subset O has the largest value of $f_O(\lambda)$. Accordingly, each subset of orders O', with its supporting product subset, is represented in graph 200 as a linear function of $\lambda$, each of which is represented as either a line 206 or 208. More particularly, lines 206 represent order subsets that are optimal subsets for some value of $\lambda$, while lines 208 represent order subsets that are sub-optimal for every value of $\lambda$.

As illustrated in the present figure, the upper envelope of a set of linear functions of $\lambda$ comprises line segments $O_1$, $O_2$, $O_3$, and $O_4$. As $\lambda$ increases, the order subset at which the maximum is achieved changes. As can also be seen in the accompanying figure, for a small $\lambda$, the line comprising segment $O_1$ is the highest linear function. As $\lambda$ increases, the line comprising segment $O_1$ no longer represents the maximum line, and the line comprising segment $O_2$ takes over. Similarly, as $\lambda$ continues to increase, the lines comprising $O_3$ or $O_4$ will provide the highest line. For a sufficiently large $\lambda$, the empty order subset represents the maximum line.

FIG. 3 is a block diagram illustrating an exemplary network 300 in accordance with an embodiment of the present invention. As discussed above, embodiments of the present invention are well suited to optimizing revenue coverage for a given size of a product set. Accordingly, the exemplary network 300 comprises a source node 302 and a target node 304. Additionally, the network 300 also comprises product nodes 306 and order nodes 308, which respectively correspond to the first and second set of intermediate nodes discussed above with respect to FIG. 1. As also mentioned above, directed links 310 extend from the source node 302 to the product nodes 306 and from the order nodes 308 to the target node 304. Further, directed links 310 extend from a product node 306 to an order node 308 if the particular product represented by node 306 is included in the order represented by node 308. The capacities of the directed links 310 from the source and product nodes 302 and 306 are assumed to be infinite, while the capacities of the directed links between order nodes 308 and target node 304 are limited to the revenue generated by the element from which the link originates.

Next, a flow is initialized through network 300 as described above with respect to FIG. 1. Then, the flow is redistributed in the manner also described above. Once redistribution of the flows is complete, the resulting network flows provide the complete frontier curve of the problem LR($\lambda$) in the following manner: For any given value of $\lambda$, the products excluded are the products associated with nodes 306 that have a flow from the source node 302 that is less than the value of $\lambda$. With this partition of the products, revenue can be calculated in the same way as before. Thus, embodiments of the present invention quickly provide an efficient frontier of revenue coverage vs. portfolio size.

Figure 4:
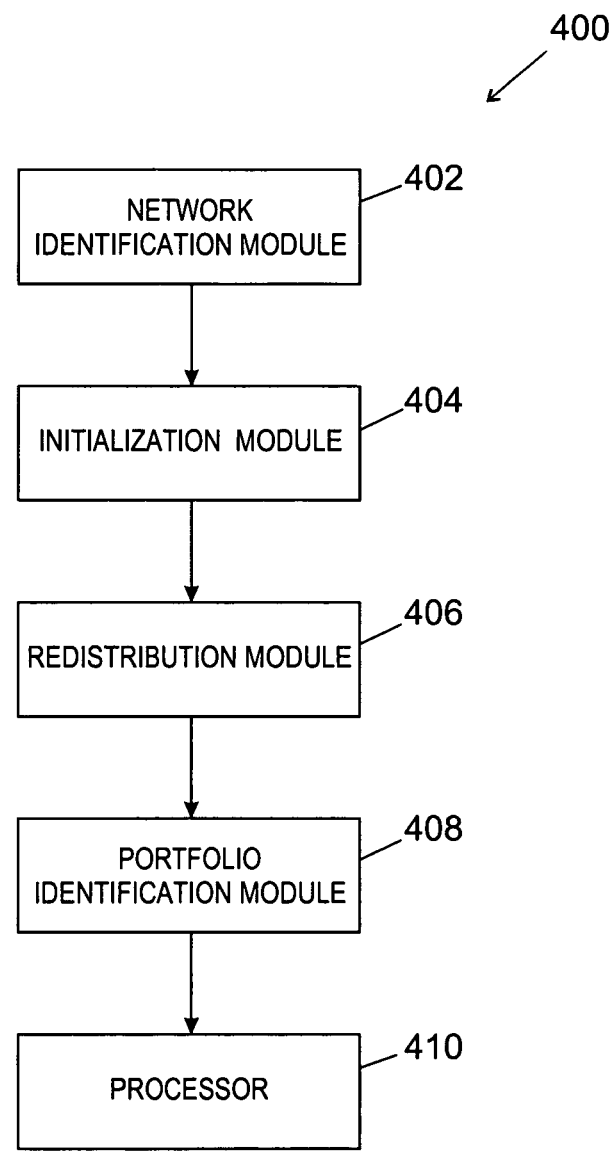
FIG. 4 is a block diagram depicting one embodiment for selecting a portfolio.

FIG. 4 is a block diagram depicting an exemplary system for selecting a portfolio. In system 400, one or more modules of a computer program, such as modules 402, 404, 406, and 408, are executed by processor 410. The network identification module 402 is performed to identify a network comprising a plurality of nodes as discussed above. The initialization module 404 is executed to initialize flow through the identified network. Additionally, a redistribution module 406 is executed to redistribute the flows through the network. Further, a portfolio identification module 408 is run to provide solutions to the optimization problem based on the distribution of flows through the network and to identify one or more members of the portfolio. In one embodiment of the present invention, for any given value of $\lambda$, the solutions to the optimization problem provided by solution module 408 designate the products to be included in an optimal product portfolio. More particularly, in the case of network 300 of FIG. 3, the portfolio includes the products associated with nodes 306 of FIG. 3 that have a flow from the source node 302 that is greater than or equal to the value of $\lambda$. While exemplary modules 402, 404, 406, and 408 are depicted as distinct entities to clarify certain aspects, embodiments of the present invention are not limited to such an arrangement. Particularly, some functions of one module can be performed by another module. Further, the modules can be combined into fewer modules or separated into a larger number of modules in accordance with the present techniques.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method for selecting a portfolio, the method comprising:
    identifying a network, the network comprising a source node, a target node, a first and second set of intermediate nodes, and a plurality of directed links, wherein the first set of intermediate nodes corresponds to a set of objects from which a portfolio is to be selected;
    initializing a network flow through the directed links of the network from the source node to the target node;
    redistributing, by a processor, the network flow, wherein the redistributing includes
        identifying two directed links from the source node to the first set of intermediate nodes that have unequal flows, and
        redistributing the flows in the two directed links such that the flows of the two directed links are substantially equal to each other; and
    identifying members of the portfolio by determining which nodes of the first set of intermediate nodes have a network flow from the source node equal to or greater than a threshold value.

2. The method of claim 1, wherein identifying the network comprises creating the network.

3. The method of claim 1, wherein the members of the portfolio are identified to maximize revenue coverage for a product set of a given size.

4. The method of claim 1, wherein the members of the portfolio are identified to maximize revenue coverage for a product set of a given cost.

5. The method of claim 1, wherein the members of the portfolio are identified to maximize profit coverage for a product set of a given size.

6. The method of claim 1, wherein the members of the portfolio are identified to maximize profit coverage for a product set of a given cost.

7. The method of claim 1, wherein the members of the portfolio are identified to maximize the number of orders covered for a product set of a given size.

8. The method of claim 1, wherein the members of the portfolio are identified to maximize the number of orders covered for a product set of a given cost.

9. The method of claim 1, wherein the set of objects is a product set.

10. The method of claim 1, wherein the second set of intermediate nodes corresponds to orders of some of the objects of the first set of intermediate nodes.

11. A method for selecting a portfolio, the method comprising:
    identifying a set of objects from which to select a portfolio;
    associating the set of objects with a first set of nodes of a network, the network further comprising a source node, a target node, a second set of nodes, and a plurality of directed links;
    initializing a network flow from the source node through the directed links of the network to the target node;
    redistributing, by a processor, the network flow, wherein the redistributing includes
        identifying two directed links from the source node to the first set of nodes that have unequal flows, and
        redistributing the flows in the two directed links such that the flows of the two directed links are substantially equal to each other; and
    determining members of the portfolio by comparing the rate of network flow through the directed links between the source node and the first set of nodes to a threshold value.

12. The method of claim 11, wherein determining members of the portfolio comprises including an object of the set of objects in the portfolio, wherein the object is associated with a node of the first set of nodes, the node having a network flow rate from the source node equal to or greater than the threshold value.

13. The method of claim 11, wherein determining members of the portfolio comprises excluding an object of the set of objects from the portfolio, wherein the object is associated with a node of the first set of nodes, the node having a network flow rate from the source node less than the threshold value.

14. The method of claim 11, further comprising generating a report identifying the portfolio.

15. A method for optimizing revenue, the method comprising:
    establishing a network comprising a source node, a target node, a set of product nodes, a set of order nodes, and a set of directed links;
    initializing a network flow through the network from the source node to the target node;
    redistributing, by a processor, the network flow, wherein the redistributing includes
        identifying two directed links from the source node to the set of product nodes that have unequal flows, and
        redistributing the flows in the two directed links such that the flows of the two directed links are substantially equal each other; and
    selecting a product set by including in the product set any product associated with a product node that has a network flow from the source node equal to or greater than a threshold value.

16. The method of claim 15, wherein a directed link extending between an order node and the target node has a flow capacity that is equal to an amount of revenue attributable to an order associated with the order node.

17. The method of claim 15, wherein directed links extending between the source node and the product nodes are to have infinite flow capacities.

18. The method of claim 15, wherein directed links extending between the product nodes and the order nodes are to have infinite flow capacities.

19. A method for optimizing revenue, the method comprising:
    identifying a network comprising a source node, a target node, a set of product nodes, a set of order nodes, and a set of directed links, wherein a first subset of directed links extends from the source node to the set of product nodes, a second subset of directed links extends from the set of order nodes to the target node, and a third subset of directed links extends from the set of product nodes to the set of order nodes, a directed link of the second subset of directed links having a flow capacity corresponding to an amount of revenue attributable to the order associated with the order node from which the directed link extends, directed links of the first and third subsets of directed links are to have infinite flow capacities;

initializing a network flow through the network from the source node to the target node such that all directed links extending from the order nodes to the target node are full;

redistributing, by a processor, the network flow, wherein the redistributing includes
identifying two directed links from the source node to the set of product nodes that have unequal flows, and
redistributing the flows in the two directed links such that the flows of the two directed links are substantially equal each other; and selecting a product set that optimizes revenue by including in the product set any product associated with a product node that has a network flow from the source node equal to or greater than a threshold value.

20. A system for selecting a portfolio, comprising:
a network identification module adapted to identify a network, the network comprising a source node, a target node, a first and second set of intermediate nodes, and a plurality of directed links, wherein the first set of intermediate nodes corresponds to a set of objects from which a portfolio is to be selected;
an initialization module adapted to initialize a network flow through the directed links of the network from the source node to the target node;
a redistribution module executed by a processor and to redistribute the network flow, wherein the redistribution module is to
identify two directed links from the source node to the first set of intermediate nodes that have unequal flows, and
redistribute the flows in the two directed links such that the flows of the two directed links are substantially equal each other; and
a portfolio identification module adapted to identify members of the portfolio by determining which nodes of the first set of intermediate nodes have a network flow from the source node equal to or greater than a threshold value.

21. The system of claim 20, wherein the network identification module is adapted to create the network.

22. The system of claim 20, wherein the first set of intermediate nodes comprise product nodes.

23. The system of claim 20, wherein the second set of intermediate nodes comprise order nodes.

24. A non-transitory computer readable medium storing machine readable instructions executable by a processor, the machine readable instructions, comprising:
a network identification module adapted to identify a network, the network comprising a source node, a target node, a first and second set of intermediate nodes, and a plurality of directed links, wherein the first set of intermediate nodes corresponds to a set of objects from which a portfolio is to be selected;
an initialization module adapted to initialize a network flow through the directed links of the network, the network flow passing from the source node to the target node;
a redistribution module executed by the processor and to redistribute the network flow, wherein the redistribution module is to
identify two directed links from the source node to the first set of intermediate nodes that have unequal flows, and
redistribute the flows in the two directed links such that the flows of the two directed links are substantially equal each other; and
a portfolio identification module adapted to identify members of the portfolio by determining which nodes of the first set of intermediate nodes have a network flow from the source node equal to or greater than a threshold value.

25. The non-transitory computer-readable medium of claim 24, wherein the identification module is adapted to create the network.

26. A system for selecting a portfolio, comprising:
a module to identify a network, the network comprising a source node, a target node, a first and second set of intermediate nodes, and a plurality of directed links, wherein the first set of intermediate nodes corresponds to a set of objects from which a portfolio is to be selected;
a module to initialize a network flow through the directed links of the network from the source node to the target node;
a redistribution module to redistribute the network flow, wherein the redistribution module is to
identify two directed links from the source node to the first set of intermediate nodes that have unequal flows, and
redistribute the flows in the two directed links such that the flows of the two directed links are substantially equal each other;
a module to identify members of the portfolio by determining which nodes of the first set of intermediate nodes have a network flow from the source node equal to or greater than a threshold value; and
a processor to implement the redistribution module.

* * * * *